(12) United States Patent
Schubert et al.

(10) Patent No.: US 8,283,422 B2
(45) Date of Patent: Oct. 9, 2012

(54) POLYETHERSILOXANES CARRYING ALKOXYSILYL GROUPS AND METHOD FOR PRODUCTION THEREOF

(75) Inventors: Frank Schubert, Neukirchen-Vluyn (DE); Frauke Henning, Essen (DE); Wilfried Knott, Essen (DE)

(73) Assignee: Evonik Goldschmidt GmbH, Essen (DE)

( * ) Notice: Subject to any disclaimer, the term of this patent is extended or adjusted under 35 U.S.C. 154(b) by 0 days.

(21) Appl. No.: 13/132,734

(22) PCT Filed: Nov. 5, 2009

(86) PCT No.: PCT/EP2009/064678
§ 371 (c)(1), (2), (4) Date: Jun. 3, 2011

(87) PCT Pub. No.: WO2010/063531
PCT Pub. Date: Jun. 10, 2010

(65) Prior Publication Data
US 2011/0245412 A1    Oct. 6, 2011

(30) Foreign Application Priority Data

Dec. 5, 2008   (DE) .................. 10 2008 044 373

(51) Int. Cl.
*C08G 77/46* (2006.01)
(52) U.S. Cl. ........................... 525/476; 528/34
(58) Field of Classification Search ................ 525/476; 528/34
See application file for complete search history.

(56) References Cited

U.S. PATENT DOCUMENTS

| | | | |
|---|---|---|---|
| 4,837,274 A * | 6/1989 | Kawakubo et al. ........ 525/100 |
| 5,719,249 A | 2/1998 | Fujita et al. |
| 6,858,663 B2 | 2/2005 | Knott et al. |
| 7,125,585 B2 | 10/2006 | Dudzik et al. |
| 7,196,153 B2 | 3/2007 | Burkhart et al. |
| 7,598,334 B2 | 10/2009 | Ferenz et al. |
| 7,612,158 B2 | 11/2009 | Burkhart et al. |
| 7,612,159 B2 | 11/2009 | Burkhart et al. |
| 7,619,035 B2 | 11/2009 | Henning et al. |
| 7,645,848 B2 | 1/2010 | Knott et al. |
| 7,754,778 B2 | 7/2010 | Knott et al. |
| 7,825,205 B2 | 11/2010 | Knott et al. |
| 7,825,206 B2 | 11/2010 | Neumann et al. |
| 7,825,209 B2 | 11/2010 | Knott et al. |
| 2002/0091219 A1 | 7/2002 | Clement et al. |
| 2007/0128143 A1 | 6/2007 | Gruning et al. |
| 2008/0125503 A1 | 5/2008 | Henning et al. |
| 2009/0137751 A1 | 5/2009 | Knott et al. |
| 2009/0137752 A1 | 5/2009 | Knott et al. |
| 2010/0002435 A1 | 1/2010 | Rash |
| 2010/0041910 A1 | 2/2010 | Schubert et al. |
| 2010/0056649 A1 | 3/2010 | Henning et al. |
| 2010/0071849 A1 | 3/2010 | Knott et al. |
| 2010/0081781 A1 | 4/2010 | Schubert et al. |
| 2010/0105843 A1 | 4/2010 | Knott et al. |
| 2010/0113633 A1 | 5/2010 | Henning et al. |
| 2010/0168367 A1 | 7/2010 | Schubert |
| 2010/0184913 A1 | 7/2010 | Ebrecht et al. |
| 2010/0249339 A1 | 9/2010 | Henning et al. |
| 2010/0266518 A1 | 10/2010 | Springer et al. |

OTHER PUBLICATIONS

Int'l Search Report, dated Jul. 2009, pp. 4.

* cited by examiner

*Primary Examiner* — Kuo-Liang Peng
(74) *Attorney, Agent, or Firm* — Frommer Lawrence & Haug LLP

(57) ABSTRACT

Alkoxysilyl-functional polyether-siloxanes and processes for preparing them by noble metal-catalysed SiC coupling of hydrogensiloxanes having SiH groups with unsaturated polyethers bearing alkoxysilyl groups or by alkoxylation of polyethersiloxanes or polysiloxanes by means of epoxy-functional alkoxysilanes in the presence of double metal cyanide catalysts.

20 Claims, 3 Drawing Sheets

Formula (Ia)

Formula (IIa)

Formula (IXa)

of olefinically unsaturated polyethers having alkoxysilyl groups with siloxanes bearing Si—H groups.

POLYETHERSILOXANES CARRYING ALKOXYSILYL GROUPS AND METHOD FOR PRODUCTION THEREOF

The invention relates to novel polyether-siloxanes bearing alkoxysilyl groups and their preparation by alkoxylation of silicone-polyethers by means of epoxide-functional alkoxysilanes over DMC catalysts or by hydrosilylative coupling of olefinically unsaturated polyethers having alkoxysilyl groups with siloxanes bearing Si—H groups.

Silicone-polyether copolymers, also referred to as polyether-siloxanes or simply silicone-polyethers, are a class of substances which has become established in a variety of industrial applications, e.g. as surfactants, emulsifiers, wetting additives and dispersants, levelling agents for surface coatings, lubricants, as auxiliaries for tertiary petroleum recovery, as textiles assistants for softening fibres, yarns or sheet-like textile products, as antifoams, as cosmetic additives (emulsifiers) and as foam stabilisers, in particular in polyurethane foam.

The polyether-siloxanes are versatile since their properties, in particular their hydrophile/hydrophobe balance, can be influenced and set to the desired value by appropriate selection of the siloxane block or siloxane blocks and by appropriate structuring of the polyether block or polyether blocks.

For the purposes of the present invention, the term polyether encompasses polyethers, polyetherols, polyether alcohols, polyether esters and also polyether carbonates, which may be used synonymously with one another.

The siloxane block can be linear or branched, with the absolute number of bifunctional and trifunctional siloxy units and their numerical ratio to one another being able to be set within wide limits. Furthermore, it is possible to bind not only polyoxyalkylene radicals but also other modifying groups to the Si atoms. Examples are long-chain hydrocarbon radicals, hydrocarbon radicals substituted by halogen atoms, cyano groups or polar radicals, hydroxyl groups, etc.

Among silicone-polyether copolymers a distinction is made in principle between SiOC- and SiC-bonded systems. In the first case, the siloxane framework is bound to the polyether radicals via SiOC bonds. In the second case, the siloxane part is joined to the polyether radicals via SiC bonds.

The relatively old route of SiOC bonding makes use of, for example, chlorosiloxanes which are reacted with polyether alcohols, often with additional use of auxiliary amine bases as hydrochloric acid scavengers, to form polyether-siloxanes. An alternative route to SiOC-based polyether-siloxanes involves the dehydrogenative reaction of siloxanes bearing SiH groups (hydrogensiloxanes) with polyether alcohols in the presence of catalysts. Catalysts used are, for example, acids, bases and metal complexes and also tris(pentafluorophenyl)borane, as described, for example, in DE 10 2005 004 676. Specific linear polyether-siloxanes can be obtained by direct alkoxylation of α,ω-dihydroxysiloxanes bearing SiOH groups by means of epoxide monomers, as described in DE 10 2008 002713.8, which is not a prior publication.

The route to SiC-bonded polyether-siloxane copolymers is opened up by hydrosilylation, i.e. the usually noble metal-catalysed addition of siloxanes having SiH-groups on to unsaturated polyethers, e.g. on to derivatives of vinyl or allyl alcohol, as described in the prior art, e.g. in EP 1 520 870. To synthesise the widespread allyl polyether-based copolymer systems, the unsaturated polyethers are used in a significant stoichiometric excess of usually from 20 to 40 mol % based on the SiH equivalents of the hydrogensiloxane used in order to take account of the fact that, depending on the preparative route chosen, varying amounts of propenyl polyethers are already present in the allyl polyether and, in order to counter the allyl-propenyl rearrangement which is unavoidable in hydrosilylation and makes part of the allyl polyether used unusable for the SiC-coupling reaction. It may be pointed out that the terms polyether or polyetherol are sometimes used synonymously in the literature and in the present patent application.

As a consequence of this procedure, the industrially available SiC-bonded silicone-polyether copolymers which are derived from allyl polyethers contain not inconsiderable amounts of the isomerised excess polyether which can no longer be hydrosilylated at its double bond located in the β position. The lower purity of the polyether-siloxanes prepared in this way causes their characteristic odour which limits the usability of the products. Additives in cosmetic formulations have to be unproblematical with regard to health and be odour-free. There are many after-purification processes in the prior art, for example as described in EP 1 431 331.

If the hydrosilylation is carried out without an excess of allyl polyether, the noble metal catalysts used lead to secondary reactions to a differing extent, depending on their nature and the reaction conditions. Thus, small amounts of moisture are sufficient to hydrolyse remaining SiH-functions with elimination of hydrogen and to condense the silanols formed with one another or with the hydroxy-functional chain ends of the polyethers. In this way, an undesirable increase in molar mass through to gelling occurs.

Conventional polyether alcohols, often also referred to simply as polyethers for short and made up predominantly of propylene oxide and ethylene oxide, have been known for a long time and are produced industrially in large quantities. They serve, inter alia, as starting compounds for reaction with polyisocyanates to produce polyurethanes or else for the preparation of surfactants.

Most processes for preparing alkoxylation products (polyethers) make use of basic catalysts, e.g. alkali metal hydroxides and alkali metal methoxides.

The use of KOH is particularly widespread and has been known for many years. A usually low molecular weight hydroxy-functional starter such as butanol, allyl alcohol, propylene glycol or glycerol is typically reacted in the presence of the alkaline catalyst with an alkylene oxide such as ethylene oxide, propylene oxide, butylene oxide or a mixture of various alkylene oxides to form a polyoxyalkylene polyether. The strongly alkaline reaction conditions promote various secondary reactions. Rearrangement of propylene oxide into allyl alcohol, which in turn functions as chain starter, and chain termination reactions result in formation of polyethers having a relatively broad molar mass distribution and unsaturated by-products. Particularly when allyl alcohol is used as starter alcohol, the alkoxylation reaction carried out with alkaline catalysis also produces propenyl polyethers which represent unreactive by-products in respect of the hydrosilylative further processing to form SiC-bonded silicone-polyether copolymers.

The disadvantages of the base-catalysed alkoxylation without doubt also include the necessity of freeing the resulting reaction products of the active base by means of a neutralisation step. Removal of the water formed in the neutralisation by distillation and removal of the salt formed by filtration are then absolutely necessary. Apart from the base-catalysed reaction, acid catalyses for alkoxylation are also known. Thus, DE 102004007561 describes the use of $HBF_4$ and of Lewis acids such as $BF_3$, $AlCl_3$ and $SnCl_4$ in alkoxylation technology.

A disadvantage of the acid-catalysed polyether synthesis is the unsatisfactory regioselectivity in the ring opening of unsymmetrical oxiranes such as propylene oxide which leads to polyoxyalkylene chains having some secondary OH-termini and some primary OH-termini being obtained in a manner which is not readily controlled. As in the case of the base-catalysed alkoxylation reaction, a work-up sequence of neutralisation, distillation and filtration is also indispensible here. If ethylene oxide is introduced as monomer into the acid-catalysed polyether synthesis, the formation of dioxane as undesirable by-product has to be reckoned with.

However, acid- and/or base-labile systems cannot be alkoxylated successfully under the conditions indicated. This applies particularly to organosilicic acid derivatives such as alkoxysilane derivatives and organosiloxane compounds which display a pronounced tendency to undergo acid- and base-induced condensation and crosslinking reactions or equilibration reactions which rearrange the siloxane skeleton. This is all the more important because both the acid- and base-induced alkoxylation reactions usually require a subsequent work-up in aqueous medium (neutralisation, removal of salts, distillation to remove water).

The as yet unpublished patent application DE 10 2008 002713.8 describes a specific process for the direct alkoxylation of SiOH-functional linear organosilanols by means of alkylene oxides in the presence of double metal catalysts to form SiOC-bonded polyether-siloxane structures.

Organic alkoxysilane compounds such as 3-glycidyloxypropyltrimethoxysilane or 3-glycidyloxypropyltriethoxysilane, which can be obtained, for example, under the trade names DYNASYLAN® GLYMO and DYNASYLAN® GLYEO (trademarks of Evonik Degussa GmbH), are particularly difficult to alkoxylate. Such compounds are employed in the preparation of organically modified networks by the sol-gel process, which serves as key process for the preparation of nanocomposites, which give coating systems having improved properties in respect of hardness, scratch and abrasion resistance, heat resistance and solvent and acid resistance. Alkoxysilane compounds are also employed in a variety of ways in sealants and adhesives and also generally as reactive bonding agents and primers for various substrates such as metals, glass and glass fibres/glass fabrics for fibre-reinforced composites comprising, for example, wood or cork and also for the surface treatment of, for example, pigments and fillers in surface coatings.

As a person skilled in the art will know, crosslinking or curing of alkoxysilyl groups occurs in a two-stage chemical process in which, in a first step in the presence of water, the alkoxy groups bound to the silicon are eliminated as corresponding alcohols and SiOH groups are formed. The latter subsequently condense with one another to form Si—O—Si bridges in the case of self-condensation and form polymeric materials. Alternatively, the SiOH-functional intermediates react with substrates bearing reactive groups, e.g. particularly well with siliceous surfaces bearing OH functions, and lead to excellent chemical anchoring to the respective substrate. The curing rate can be influenced in a variety of ways by addition of catalysts or by varying the temperature.

There has been no lack of attempts to improve the property profiles of alkoxysilane compounds by chemical modification in order to open up further fields of application for this important class of products. Thus, it is known from the literature that the property profile of polyethers can be combined with that of crosslinkable compounds bearing specific alkoxysilyl groups. Thus, DE 69 831518 T2 concerns, for example, the modification of polyether alcohols with, for example, alkoxysilanes bearing isocyanate groups with formation of urethane links. Furthermore, hydrosilylative bonding of monomeric trialkoxysilanes on to polyetherols which have been modified beforehand with olefinically unsaturated end groups is also selected for alkoxysilyl modification.

JP 11-021463 relates to a process for preparing trialkoxysilyl-terminated polyoxyalkylene ethers which are derived from glycerol as trifunctional alcohol by modifying the respective glycerol polyether triols by means of trialkoxysilanes bearing isocyanate groups with formation of urethane links.

JP 08-295805 claims an essentially comparable process which comprises the trialkoxysilyl-modification of dipropylene glycol polyether diols prepared via DMC catalysis with trialkoxysilanes bearing isocyanate groups.

The documents JP 09-012863, JP 09-012861 and JP 07-062222 claim a process for preparing polyetherols bearing exclusively terminally hydrolysable trialkoxysilyl functions, e.g. glycerol polyetherols, which are firstly prepared via DMC catalysis and are then converted by addition of alkali metal alkoxide and allyl chloride into the corresponding allyl ethers and subsequently by platinum metal-catalysed hydrosilylation into the alkoxysilyl-terminated target products.

In the hitherto unpublished patent application DE 10 2008 000360.3, polyethers bearing alkoxysilyl groups are prepared in the presence of double metal cyanide catalysts, also known as DMC catalysts, by selective alkoxylation of epoxy-functional alkoxysilanes from OH-functional starters such as alcohols, phenols or polyetherols without the undesirable secondary reactions characteristic of this group of substances (condensation and crosslinking reactions) occurring under the reaction conditions. The products obtained by this process are crosslinkable polyethers having either, as desired, lateral or terminal reactive alkoxysilyl groups. Such polyethers which can be crosslinked in the presence of moisture are outstandingly suitable as adhesives and binders and also for coatings and, for example, sealants.

There has hitherto been a lack of products which combine the valued surfactant properties of polyether-siloxanes with the reactive, crosslinkable alkoxysilyl compounds.

It is an object of the invention to provide alkoxysilyl-functional polyether-siloxanes which combine the property profile of the two different classes of substances so that they are able, on the basis of their surface-active properties, firstly to migrate to the respective interface of the system concerned and then be cured via the alkoxysilyl groups at their desired destination, e.g. on a desired substrate surface. Used as additives in, for example, adhesives, paints and varnishes or coating compositions in general, they open up, for example, the possibility of intensive wetting of the substrates with a simultaneous adhesive action. As a result of curing of their alkoxysilyl groups in the presence of water, for which atmospheric moisture is sufficient, they are subsequently permanently chemically fixed to the respective surface. Thus, they are suitable as, for example, primers and coating compositions for a variety of substrates, in particular when the latter have functional groups which react with alkoxysilyl groups, e.g. OH groups. Furthermore, alkoxysilyl-functional silicone-polyethers can be used as spreaders which are applied in a very thin layer to surfaces such as glass, metals, wood, masonry or plastics and, after hydrolysis of the alkoxysilyl groups, are permanently added on there so as to modify the surface. Depending on their structure, they can function, for example, as hydrophobicising agents or as bonding agents.

A further object of the invention is to control the surfactant properties of the silyl-functional polyether-siloxanes of the invention via the hydrophile-hydrophobe balance, i.e. by variation of the proportion of hydrophobic siloxane and the proportion of hydrophilic polyether in the copolymer within wide limits, as is known for the conventional uncrosslinkable polyether-siloxane surfactants.

In addition to this objective, it is an object of the invention to provide processes for preparing such, for example, surface-active polyether-siloxanes bearing alkoxysilyl groups which allow this requirement for structural variety to be achieved.

It has surprisingly been found that polyether-siloxanes can be alkoxylated by means of epoxides bearing alkoxysilyl groups with the aid of DMC catalysts whose catalytically active sites have Lewis acid properties. This is in no way obvious to a person skilled in the art since Lewis-acid metal compounds are used in the prior art as crosslinking catalysts for alkoxysilanes.

Furthermore, it has surprisingly been found that alkoxysilyl-functional polyether-siloxanes can be prepared by noble metal-catalysed SiC coupling of hydrogensiloxanes having SiH groups with unsaturated polyethers bearing alkoxysilyl groups without the reactive alkoxysilyl groups undergoing secondary reactions in this hydrosilylation reaction. This would not have been foreseen by a person skilled in the art since the tendency of a monomeric alkoxysilyl group to undergo hydrolysis is far greater than the hydrolysis tendency of relatively high molecular weight hydrogensiloxanes for which hydrolysis and condensation reactions under the reaction conditions of hydrosilylation have previously been observed.

The present invention therefore provides alkoxysilyl-functional polyether-siloxanes of the Formula (I) and processes for preparing them.

The alkoxysilyl-functional polyether-siloxanes of the invention are compounds of the Formula (I) and mixtures thereof,

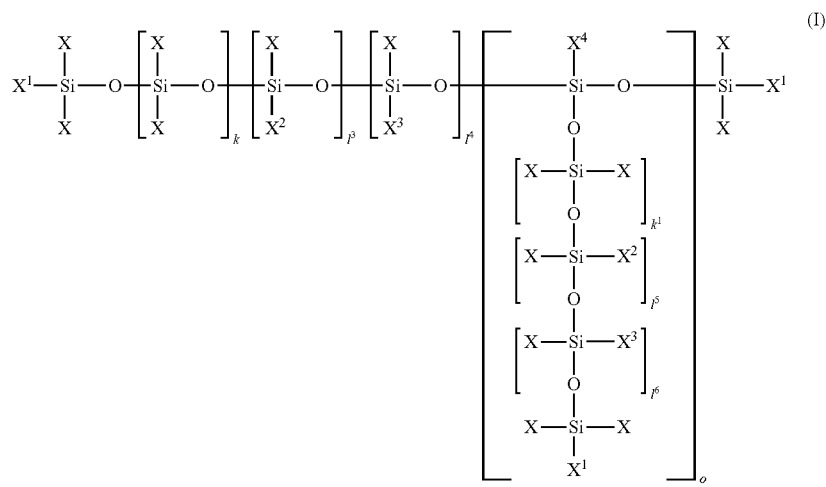

where

Figure 1:
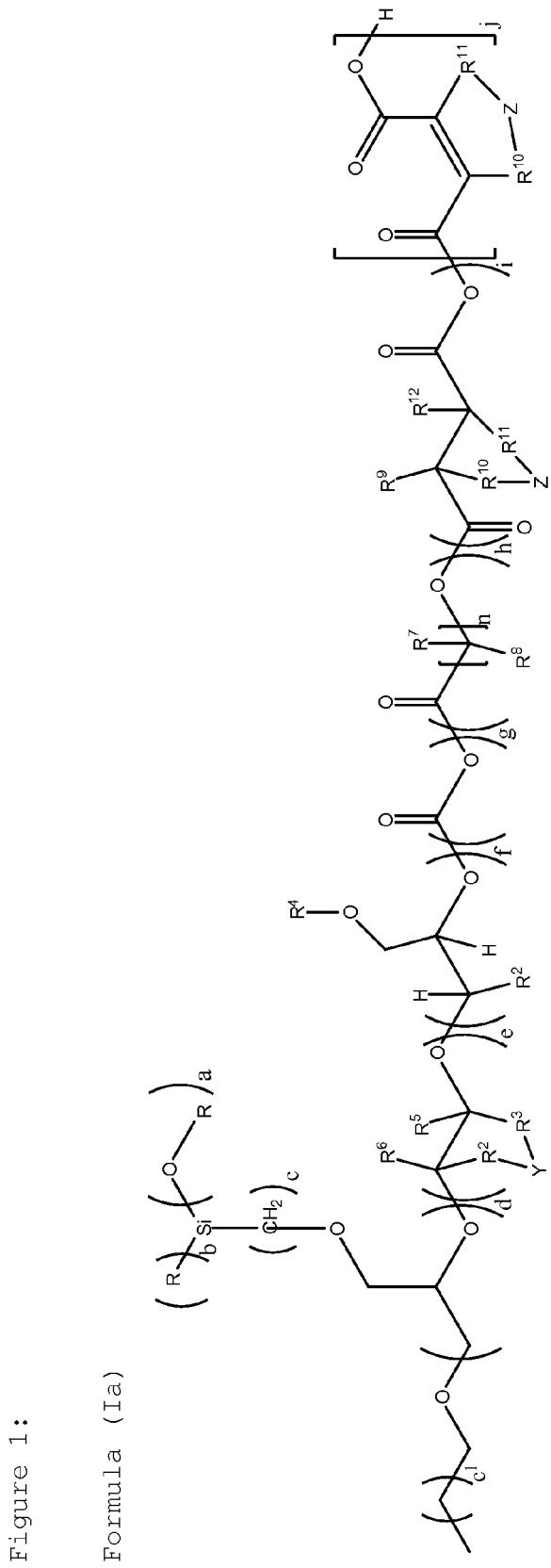
FIG. 1 is an enlarged version of Formula (Ia).

X is a linear, cyclic or branched, aliphatic or aromatic, saturated or unsaturated hydrocarbon radical which has from 1 to 20 carbon atoms and may, if desired, contain heteroatoms such as oxygen, nitrogen, phosphorus or sulphur but is preferably a methyl group, $X^1$ is, as desired, X, $X^2$ or $X^3$, $X^2$ is an OH-functional, if desired, ester- or carbonate-modified polyoxyalkylene radical bearing alkoxysilyl groups and having the Formula (Ia)—see also FIG. 1,

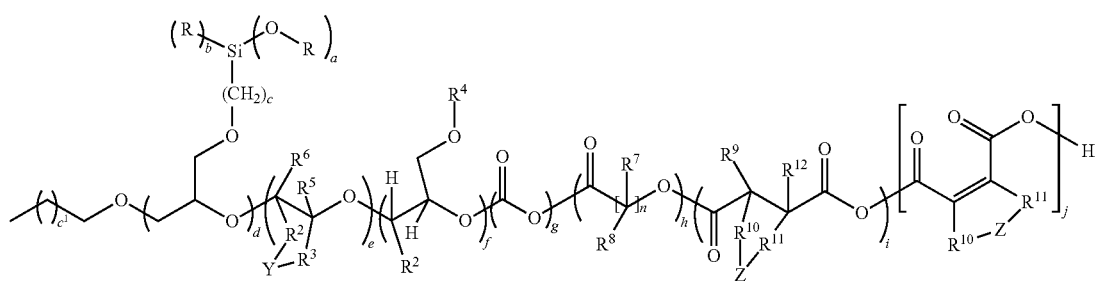
(Ia)

$X^3$ is a terminally etherified polyoxyalkylene radical of the Formula (Ib),

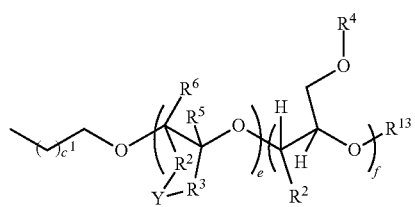
(Ib)

where
$R^{13}$ is, as desired, an alkyl group having from 1 to 18 carbon atoms, preferably methyl,
or a polyoxyalkylene radical terminally esterified with a monofunctional carboxylic acid and having the Formula (Ic),

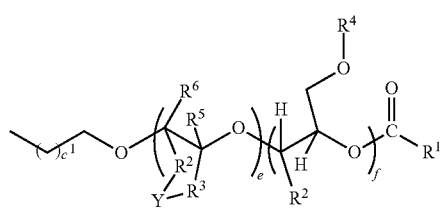
(Ic)

where
$R^{14}$ is a saturated or monounsaturated or polyunsaturated, either linear or branched, aliphatic or aromatic hydrocarbon radical which has 1-30 carbon atoms and may in turn bear OH groups, preferably a methyl radical,
$X^4$ corresponds either to $X^1$ or the fragment of the Formula (Id)

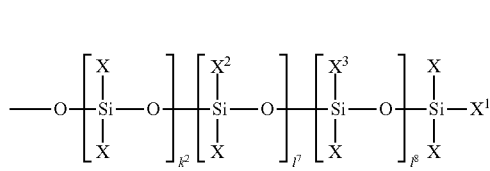
(Id)

where
$k$, $k^1$ and $k^2$ are each, independently of one another, integers from 0 to 500, preferably from 10 to 200, in particular from 15 to 100, $l^3$, $l^4$, $l^5$, $l^6$, $l^7$ and $l^8$ are each, independently of one another, an integer from 0 to 60, preferably from 0 to 30, in particular from 0 to 25,
o is an integer from 0 to 10, preferably from 0 to 3, with the proviso that
$X^1$ is at least once identical to $X^2$ if the sum of $l^3$, $l^5$ and $l^3$ is zero
and that the sum of $l^3$, $l^5$ and $l^7$ is at least 1 when $X^1$ is not identical to $X^2$,
where
a is an integer from 1 to 3, preferably 3,
b is an integer from 0 to 2, preferably from 0 to 1, particularly preferably 0,
the sum of a and b is 3,
c is an integer from 0 to 24, preferably from 0 to 12, particularly preferably from 0 to 8, very particularly preferably from 0 to 4,
$c^1$ is an integer from 0 to 24, preferably from 0 to 12, particularly preferably from 0 to 8, very particularly preferably from 0 to 4,
d is an integer from 1 to 500, preferably from 1 to 100, particularly preferably from 1 to 50 and in particular from 1 to 25,
e is an integer from 0 to 5000, particularly preferably from 0 to 1000 and in particular from 0 to 500,
n is an integer from 2 to 8 and
f, g, h, i and j are each an integer from 0 to 500, preferably from 0 to 300, particularly preferably from 0 to 200, in particular from 0 to 100,
with the proviso that the fragments having the indices d to j can be freely permutated among one another, i.e. can be exchanged with one another in the sequence within the polyether chain, and the various monomer units of the fragments having the indices d to j can be arranged in blocks or else can be distributed randomly and with the proviso that the fragments having the indices k, $k^1$, $k^2$, $l^3$, $l^4$, $l^5$, $l^6$, $l^7$, $l^8$ and o can be permutated freely among one another, i.e. can be exchanged with one another within the siloxane chain and can, as desired, be randomly distributed or arranged in blocks.

R represents one or more identical or different radicals selected from among linear or branched, saturated, monounsaturated or polyunsaturated alkyl radicals having from 1 to 20, in particular from 1 to 6, carbon atoms or haloalkyl groups having from 1 to 20 carbon atoms, preferably a methyl, ethyl, propyl, isopropyl, n-butyl or sec-butyl group.

Figure 2:
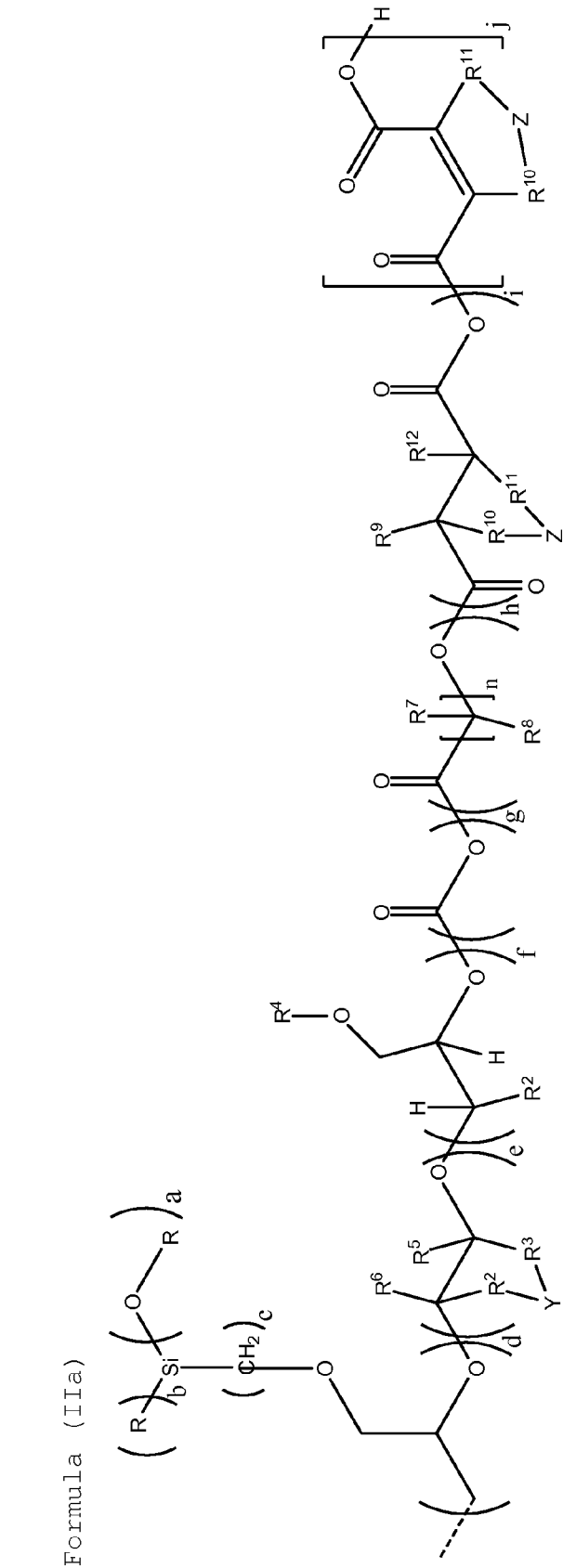
FIG. 2 is an enlarged version of Formula (IIa).

$R^2$ or $R^3$ and also $R^5$ or $R^6$ are identical or are each, independently of one another, H or a saturated or, if desired, monounsaturated or polyunsaturated, also further substituted, if desired, monovalent or polyvalent hydrocarbon radical, where the radicals $R^5$ and $R^6$ are each a monovalent hydrocarbon radical. The hydrocarbon radical can be cycloaliphatically bridged via the fragment Y; Y can be absent or else be a methylene bridge having 1 or 2 methylene units; if Y is 0, $R^2$ and $R^3$ are each, independently of one another, a linear or branched radical having from 1 to 20, preferably from 1 to 10, carbon atoms, particularly preferably a methyl, ethyl, propyl or butyl, vinyl, allyl or phenyl radical. Preference is given to at least one of the two radicals in $R^2$ or $R^3$ being hydrogen. The hydrocarbon radicals $R^2$ and $R^3$ may in turn be substituted further and bear functional groups such as halogens, hydroxyl groups or glycidyloxypropyl groups.

alkyl radicals having from 1 to 20, in particular from 1 to 10, carbon atoms, and m is an integer from 0 to 5000, preferably from 2 to 5000, particularly preferably from 5 to 4000 and in particular from 9 to 3000, and $X^7$ corresponds to the polyether fragment of the Formula (IIa)—see also FIG. 2.

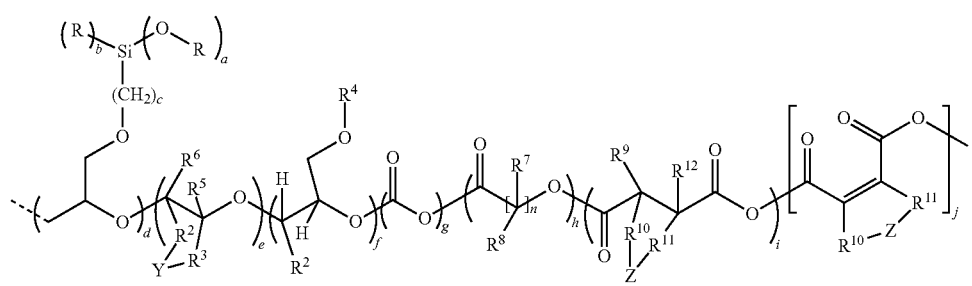

(IIa)

$R^4$ is a linear or branched alkyl radical which has from 1 to 18 carbon atoms and can be bound to an aromatic or cycloaliphatic radical.

$R^7$ and $R^8$ are, independently of one another, either hydrogen, alkyl, alkoxy, aryl or aralkyl groups.

$R^9$, $R^{10}$, $R^{11}$ and $R^{12}$ are, independently of one another, either hydrogen, alkyl, alkenyl, alkoxy, aryl or aralkyl groups, with the hydrocarbon radical being able to be cycloaliphatically or aromatically bridged via the fragment Z and Z being able to be either a divalent alkylene radical or an alkenylene radical.

The polyether-siloxanes described by the Formula (I) include the by-products which may be present as a result of the process, e.g. free excess polyethers or rearrangement products.

The various monomer units within the siloxane chain or within the polyether chain bound thereto can be arranged either in blocks or randomly, as desired. The indices shown in the formulae presented here and the value ranges of the indices indicated are the averages of the possible random distribution of the actual isolated structures and/or mixtures thereof. This also applies to structural formulae which are shown precisely in themselves.

The polyether-siloxanes having the alkoxysilyl functionalisation of the Formula (I) are usually comb-like branched copolymers in which the polyether chains are each bound via SiC bonds to the polysiloxane backbone.

The invention likewise provides linear polyether-siloxane-polyether triblock copolymers of the Formula (II) in which the polyether chains having alkoxysilyl groups are bound via an Si—O—C linkage to the siloxane body,

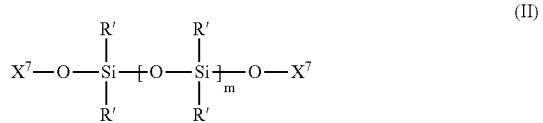

(II)

where

R' corresponds to one or more identical or different, linear or branched, saturated, monounsaturated or polyunsaturated The substituents R, $R^2$-$R^{12}$, the radicals Y and Z and the indices a, b, c, d, e, f, g, h, i, j and n correspond to the definitions given above for the compounds of the Formula (Ia).

The indices shown in the formulae (I) to (Id) and (II) and also (IIa) and the value ranges of the indices indicated are the averages of the possible random distribution of the actual structures present and/or mixtures thereof.

The invention further provides the processes mentioned below for preparing alkoxysilyl-functional polyether-siloxanes, which proceed to give the siloxane framework.

Alkoxysilyl-functional polyether-siloxanes and mixtures thereof can be prepared by two different processes:

1) Alkoxylation of silicone-polyether copolymers or polysiloxanes by means of epoxy-functional alkoxysilanes over double metal cyanide catalysts and/or 2) Hydrosilylative coupling of unsaturated polyethers bearing alkoxysilyl groups which have been obtained beforehand by alkoxylation of the corresponding unsaturated starter compounds by means of epoxy-functional alkoxysilanes over DMC catalysts.

Both processes can be carried out independently of one another but can also be carried out in succession in any desired way.

The two processes are described in detail below.

1) Alkoxylation of Silicone-Polyether Copolymers or Polysiloxanes by Means of Epoxy-Functional Alkoxysilanes Over Double Metal Cyanide Catalysts The DMC-catalysed alkoxylation of polyether-siloxanes and their mixtures containing, for example, excess polyether, rearrangements products or other by-products, which have been prepared beforehand by the method of hydrosilylation, is described in DE 10 2008 043245.8, which is not a prior publication. It has now been found that not only, for example, alkylene oxides, lactones or, for example, cyclic anhydrides can be added on to the OH-bearing siloxane-bound or free polyethers of the polyether-siloxane systems functioning as starter compounds with ring opening, but even epoxy-functional alkoxysilanes of the Formula (III),

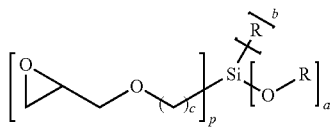

(III)

where
the indices a, b and c and the radical R have the meanings defined for Formula (Ia) and p is an integer which corresponds to the difference 4-a-b.

The epoxy-functional compounds, lactones, glycidyl compounds and/or cyclic anhydrides can be used either alone or in any mixtures with one another.

A non-exhaustive selection of such epoxide-substituted alkoxysilanes of the Formula (III) encompasses, for example, 3-glycidyloxypropyltrimethoxysilane, 3-glycidyloxypropyltriethoxysilane, 3-glycidyloxypropyltripropoxysilane, 3-glycidyloxypropyltriisopropoxysilane, bis(3-glycidyloxypropyl)dimethoxysilane, bis(3-glycidyloxypropyl)diethoxysilane, 3-glycidyloxyhexyltrimethoxysilane, 3-glycidyloxyhexyltriethoxysilane, 3-glycidyloxypropylmethyldimethoxysilane, 3-glycidyloxypropylethyldiethoxysilane. Very particular preference is given to compounds of the Formula (III) in which p is 1.

The alkoxylation according to the invention is so selective that the siloxane framework is retained and the hydrolysis and crosslinking reactions characteristic of silane compounds are avoided. The use of epoxy-functional alkoxysilanes as monomers in the alkoxylation by means of DMC catalysis has hitherto only been known for use of purely organic chain starters such as alcohols, polyetherols and phenolic components and is described in DE 10 2008 000360.3, which is not a prior publication.

The epoxy-functional alkoxysilanes of the Formula (III) can be used in the DMC-catalysed alkoxylation for the preparation of crosslinkable polyether-siloxanes as required in succession in any order of addition or in admixture with alkylene oxides of the general Formula (IV),

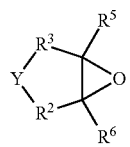

(IV)

where $R^2$ or $R^3$ and also $R^5$ or $R^6$ are identical or are each, independently of one another, H or a saturated or, if desired, monounsaturated or polyunsaturated, monovalent or polyvalent hydrocarbon radical also further substituted, if desired, where the radicals $R^5$ and $R^6$ are each a monovalent hydrocarbon radical. The hydrocarbon radical can be cycloaliphatically bridged via the fragment Y; Y can be absent or else be a methylene bridge having 1 or 2 methylene units; if Y is 0, $R^2$ and $R^3$ are each, independently of one another, a linear or branched radical having from 1 to 20, preferably from 1 to 10, carbon atoms, particularly preferably a methyl, ethyl, propyl or butyl, vinyl, allyl or phenyl radical. Preferably at least one of the two radicals in Formula (IV) $R^2$ or $R^3$ is hydrogen. Particularly preferred alkylene oxides are ethylene oxide, propylene oxide, 1,2- or 2,3-butylene oxide, isobutylene oxide, 1,2-dodecene oxide, styrene oxide, cyclohexene oxide (here $R^2$-$R^3$ is a —CH$_2$CH$_2$CH$_2$CH$_2$— group, and Y is thus —CH$_2$CH$_2$—) or vinylcyclohexene oxide or mixtures thereof. The hydrocarbon radicals $R^2$ and $R^3$ in Formula (IV) may in turn be substituted further and bear functional groups such as halogens, hydroxyl groups or glycidyloxypropyl groups. Such alkylene oxides include epichlorohydrin and 2,3-epoxy-1-propanol.

It is likewise possible to use glycidyl compounds such as glycidyl ethers and/or glycidyl esters of the general Formula (V),

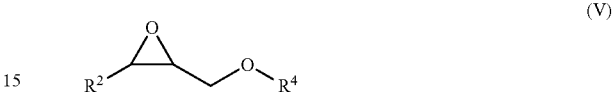

(V)

where at least one glycidyloxypropyl group is bound via an ether or ester fraction to a linear or branched alkyl radical $R^4$ having from 1 to 24 carbon atoms, an aromatic or cycloaliphatic radical, in combination with the epoxide-functional alkoxysilanes represented by Formula (III) and, if desired, in addition to the alkylene oxides of the Formula (IV). This class of compounds includes, for example, allyl, butyl, 2-ethylhexyl, cyclohexyl, benzyl, $C_{12}/C_{14}$-fatty alcohol, phenyl, p-tert-butylphenyl and o-kresyl glycidyl ethers. Preferred glycidyl esters are, for example, glycidyl methacrylate, glycidyl acrylate and glycidyl neodecanoate. It is likewise possible to use polyfunctional epoxide compounds such as 1,2-ethyldiglycidyl, 1,4-butyldiglycidyl or 1,6-hexyldiglycidyl ether.

The alkoxysilanes of the Formula (III) bearing epoxide groups which can be used according to the invention can, if desired in combination with further epoxides of the Formulae (IV) and (V), also be copolymerised under the conditions of DMC-catalysed alkoxylation in admixture with lactones of the Formula (VI),

(VI)

where
n is an integer from 2 to 8 and
$R^7$ and $R^8$ are, independently of one another, either hydrogen, alkyl, alkoxy, aryl or aralkyl groups, in a ring-opening polymerisation to form crosslinkable polyether-siloxanes containing alkoxysilane groups and having ester functions in the polyether fragments. Suitable lactones which can be used in this context are, for example, ε-caprolactone, δ-valerolactone and γ-butyrolactone and also mixtures of various lactones. Preference is given to using ε-caprolactone as comonomer. During the alkoxylation process, the respective epoxide and lactone monomers can be copolymerised in any order and in variable amounts in succession or in parallel to form polyether esters having a block-like or random sequence of the individual monomer building blocks.

As an alternative to or in addition to lactones, it is also possible to use saturated, unsaturated or aromatic cyclic dicarboxylic anhydrides of the Formulae (VII) and (VIII) as comonomers in addition to the epoxide-bearing alkoxysilanes of the Formula (III) which can be used according to the invention and, if desired, further epoxides of the Formulae (IV) and (V) under the conditions of DMC-catalysed alkoxylation,

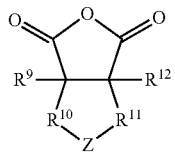
(VII)

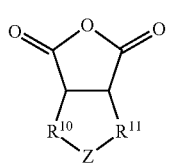
(VIII)

where $R^9$, $R^{10}$, $R^{11}$ and $R^{12}$ are, independently of one another, either hydrogen, alkyl, alkenyl, alkoxy, aryl or aralkyl groups.

The hydrocarbon radical can be cycloaliphatically or aromatically bridged via the fragment Z, where Z can be either a divalent alkylene radical or an alkenylene radical. Preferred cyclic anhydrides are succinic anhydride, oct(en)yl succinic, dec(en)yl succinic and dodec(en)yl succinic anhydrides, maleic anhydride, phthalic anhydride, hexahydrophthalic, tetrahydrophthalic, dihydrophthalic, methylhexahydrophthalic and methyltetrahydrophthalic anhydrides. During the alkoxylation process, the respective anhydride monomers can be copolymerised in any order and in variable amounts in succession or in parallel with the epoxide feed with ring-opening to form polyether esters. Mixtures of anhydrides of the Formulae (VII) and (VIII) can also be used.

If the alkoxylation of epoxy-functional alkoxysilanes, if desired in the presence of further epoxide compounds or comonomers, is carried out in the presence of carbon dioxide, polyether- or polyether-ester-substituted polyether-siloxanes modified with carbonate groups can be prepared by insertion of carbon dioxide into the polyether chain. Such reactions preferably take place in autoclave reactors under superatmospheric pressure and under carbon dioxide. The carbonate content is variable and can be controlled, for example, by choice of the temperature and pressure conditions during the reaction.

Suitable chain starters are SiC-bonded polyether-siloxanes of the Formula (IX) and mixtures thereof which are usually prepared industrially by noble metal-catalysed hydrosilylation reactions of the corresponding hydrogensiloxanes with terminally unsaturated, for example allyl alcohol-based, polyethers and have at least one hydroxyl group bound to the polyether fragment. Such polyethers are prepared in a separate, preceding alkoxylation process according to the prior art by usually alkali-, acid- or DMC-catalysed alkoxylation of allyl alcohol by means of alkylene oxides and possibly additional monomers,

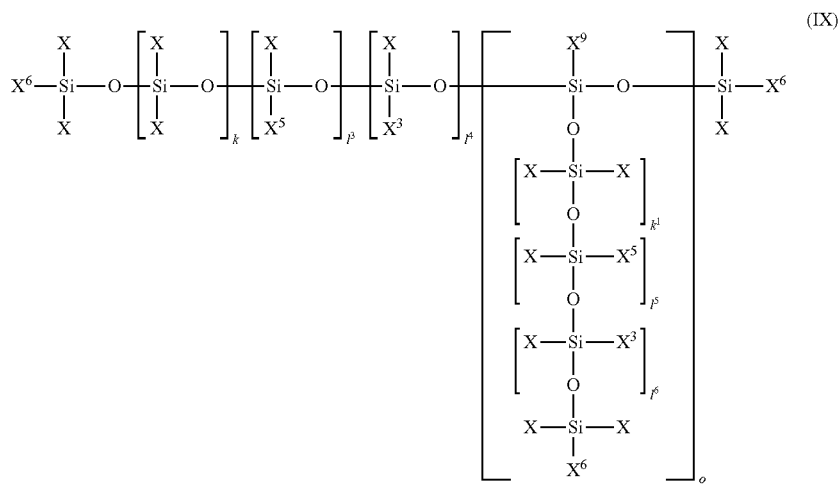
(IX)

where
$X^6$ is, as desired, X, $X^3$ or $X^5$,
$X^9$ corresponds, as desired, to $X^6$ or the fragment of the Formula (IXd),

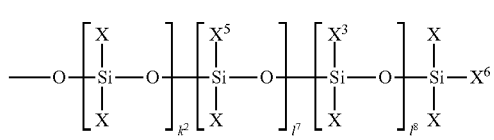
(IXd)

$X^5$ is an OH-functional, if desired ester- or carbonate-modified polyoxyalkylene radical of the Formula (IXa),

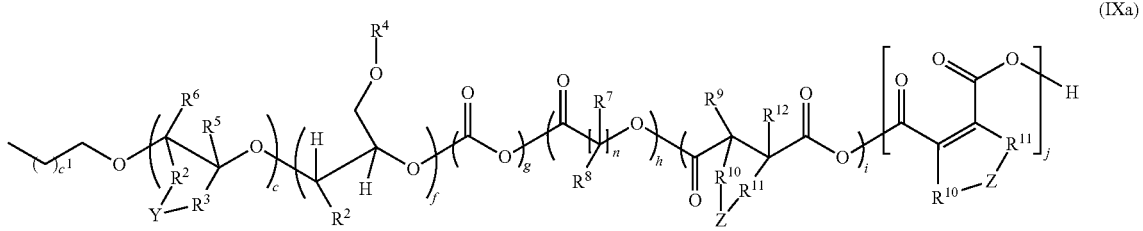
(IXa)

Figure 3:
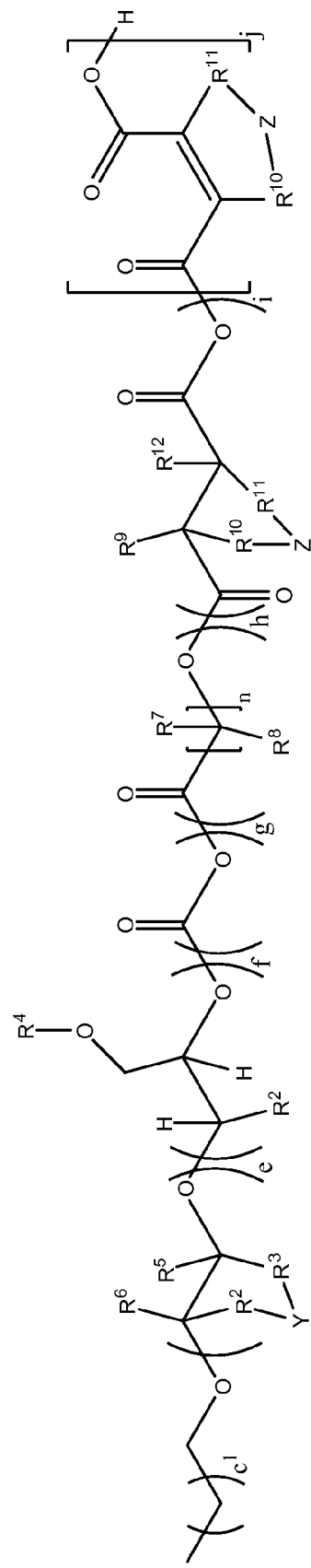
FIG. 3 is an enlarged version of Formula (IXa).

-see also Figure 3 where the indices k, $k^1$, $k^2$, $l^3$, $l^4$, $l^5$, $l^6$, $l^7$, $l^8$ and o, $c^1$, e, f, g, h, i, j and n and also the fragments X, $X^3$ and likewise the radicals $R^2$ to $R^{14}$ and also Y and Z have the meanings given above for the Formula (I) or (Ia),
with the provisos that
the fragments denoted by the indices e, f, g, h, i and j in the polyether chain and those denoted by the indices k, $k^1$, $k^2$, $l^3$, $l^4$, $l^5$, $l^6$, $l^7$, $l^8$ and o in the siloxane framework can be permutated freely with one another, i.e. can be exchanged with one another in the sequence within the chain and can be arranged in blocks or be randomly distributed, the polyether-siloxanes described by Formulae (IX) encompass the by-products which may be present as a result of the process, e.g. free excess polyether or rearrangement products, and
the numerical values of e, f, g, h, i and j are less than or equal to the values of these indices in Formula (Ia).

alkoxysilanes and, if desired, further monomers in the presence of a DMC catalyst to form polyether-siloxanes of the Formula (II) bearing silyl groups,

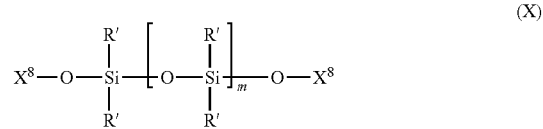
(X)

where
R' and m correspond to the meanings in Formula (II) and $X^8$ is either hydrogen or corresponds to the polyether fragment of the Formula (Xa),

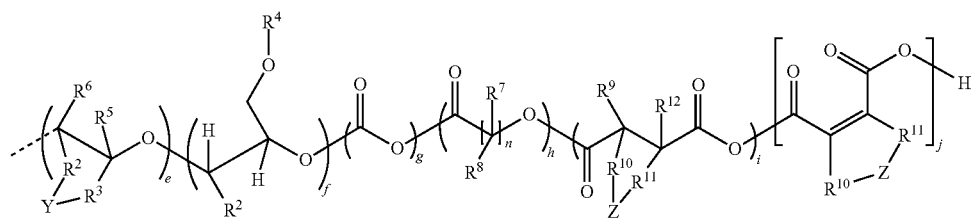
(Xa)

In the simplest case, silicone-polyethers of the Formula (IX) are chain-extended by addition of at least one epoxy-functional alkoxysilane of the Formula (III) per molecule of the Formula (IX), i.e. extended at the end of the polyether by at least one crosslinkable alkoxysilyl group, at the OH termini of the comb-like or lateral polyoxyalkylene chains in the presence of a DMC catalyst by a process according to the invention. If free OH-functional polyethers which are not bound to the siloxane skeleton are present in admixture with the chain starter in an industrial polyether-siloxane, these are also alkoxysilyl-functionalised under the reaction conditions.

End products of relatively high purity are obtained by the process of the invention by using siloxanes which have been functionalised by hydrosilylation using low molecular weight hydroxy-functional unsaturated compounds and have been freed of the isomerised excess starting materials by subsequent distillation. When these highly pure siloxanes are used as starters in the alkoxylation, pure alkoxysilyl-functional polyether-siloxanes without siloxane-free secondary constituents are obtained.

The process claimed according to the invention ensures synthetic freedom in reacting silanols, for example also linear polydimethylsiloxanediols or SiOC-bonded polyether-siloxanes of the Formula (X) based thereon, with epoxy-functional where
the indices e, f, g, h, i, j and n and also the radicals $R^2$ to $R^{12}$ and also Y and Z have the meanings given above for the Formula (II), with the provisos that
the fragments denoted by the indices e, f, g, h, i and j in the polyether chain can be freely permutated among one another, i.e. can be exchanged with one another in the sequence within the chain and can be arranged in blocks or be randomly distributed,
the polyether-siloxanes described by the Formula (X) include the by-products which may be present as a result of the process, e.g. rearrangement products, and
the numerical values of e, f, g, h, i and j are less than or equal to the values of these indices in Formula (II).

Short-chain, commercially available silanols of the Formula (X) with $X^8$=H, in particular, can contain cyclic siloxane species formed by condensation, e.g. octamethylcyclotetrasiloxane and decamethylcyclopentasiloxane, as secondary constituents. These siloxane rings do not bear any reactive SiOH groups and are thus inert in the alkoxylation reaction according to the invention in the presence of DMC catalysts. Depending on requirements or the field of application of the desired alkoxylation products, any such cyclic siloxane compounds present can either remain in the system or be entirely or partly removed by, for example, a simple vacuum distillation. The removal of cyclic siloxane species by distillation can be carried out either before the alkoxylation or after the alkoxylation is complete.

Short-chain, industrially produced silanols of the Formula (X), in particular, can contain small concentrations of water as further typical condensation product. Should the water concentration reach extraordinarily high values of, for example, above 0.3% in the silanol, it can be advantageous to remove at least part of the water from the silanol starter by vacuum distillation before addition of the DMC catalyst and before commencement of the alkoxylation, since it can not only have an inhibiting effect on the catalytic activity of the double metal cyanide but can also trigger hydrolysis reactions and thus undesirable crosslinking reactions of the alkoxysilyl groups during the alkoxylation. A very low water content in the silanediol starter is desirable. To achieve rapid commencement of the reaction and to avoid any hydrolysis risks in the alkoxylation, it is advantageous to remove any water present in the silanediol starter by distillation before addition of the DMC catalyst and the epoxy-functional alkoxysilanes.

Compounds of the Formulae (IX) and (X) can also be alkoxylated in any mixture together with epoxy-functional alkoxysilanes and, if desired, further monomers by the process of the invention.

The preparation of the double metal cyanide catalysts (DMC catalysts) used for the process claimed according to the invention and their use as alkoxylation catalysts have been known since the 1960s and are described, for example, in U.S. Pat. No. 3,427,256, U.S. Pat. No. 3,427,334, U.S. Pat. No. 3,427,335, U.S. Pat. No. 3,278,457, U.S. Pat. No. 3,278,458 or U.S. Pat. No. 3,278,459. The evermore effective types of DMC catalysts developed in subsequent years and described, for example, in U.S. Pat. No. 5,470,813 and U.S. Pat. No. 5,482,908 include, in particular, zinc-cobalt hexacyano complexes. Thanks to their extraordinarily high activity, only low catalyst concentrations are required for preparing polyetherols, so that the work-up step required for conventional alkaline catalysts, comprising neutralisation, precipitation and removal of the catalyst by filtration, at the end of the alkoxylation process can be dispensed with.

The prior art refers to various alkoxylation processes which employ catalysis using double metal cyanide catalysts. Reference may at this point be made to, for example, EP-A1-1 017 738, U.S. Pat. No. 5,777,177, EP-A1-0 981 407, WO 2006/002807 and EP-A1-1 474 464.

To start the alkoxylation reaction according to the process of the invention, the starter mixture comprising the one or more OH-functional starter compounds of the Formula (IX) or (X) or mixtures thereof and the double metal cyanide catalyst which may, if appropriate, have been slurried in a suspension medium beforehand, are placed in the reactor. As suspension medium, it is possible to use either a polyether or inert solvents or advantageously one or more starter compounds, or alternatively a mixture of these components. At least one of the epoxide compounds of the Formula (III), (IV) or (V) is added to the initially charged starter mixture. To start the alkoxylation reaction and to activate the double metal cyanide catalyst, only part of the total amount of epoxide to be introduced is usually added at first. The molar ratio of epoxide to the reactive groups of the starter, in particular the OH groups in the starter mixture, is preferably 0.1-100:1, particularly preferably 0.2-60:1, in particular 0.4-40:1, during the starter phase. It can be advantageous to remove any materials which may be present and which inhibit the reaction and in particular water from the reaction mixture, e.g. by distillation before addition of the epoxide.

The commencement of the exothermic reaction can be detected, for example by monitoring pressure and/or temperature. A sudden drop in the pressure in the reactor indicates, in the case of gaseous alkylene oxides, that the alkylene oxide is being incorporated, the reaction has thus started and the end of the start phase has been reached. In the case of nongaseous glycidyl ethers/esters or epoxy-functional alkoxysilanes, commencement of the reaction is indicated by the evolution of heat.

After the start phase, i.e. after initialisation of the reaction, either further starter compound together with further epoxide or further epoxide alone are/is introduced as a function of the desired molar mass. As an alternative, any mixture of different epoxides of the Formulae (III), (IV) and (V) can also be added on. The epoxide monomers of the Formulae (III), (IV) and (V) which can be used according to the invention can also be added on in succession in any order. The reaction can be carried out in an inert solvent, for example to reduce the viscosity of the reaction mixture. Suitable inert solvents are hydrocarbons, in particular toluene, xylene or cyclohexane.

In the products according to the invention, the molar ratio of the sum of the epoxides introduced, including the epoxides already added in the start phase, based on the starter compound used, in particular based on the number of OH groups of the starter compound used, is preferably $1$-$10^4$:$1$, in particular $1$-$10^3$:$1$.

The addition reaction of the epoxide compounds preferably takes place at a temperature of from 60 to 250° C., particularly preferably at a temperature of from 90 to 160° C. The pressure at which the alkoxylation takes place is preferably from 0.02 bar to 100 bar absolute, particularly preferably from 0.05 to 20 bar absolute and in particular from 0.2 to 2 bar absolute. Carrying out the alkoxylation at subatmospheric pressure enables the reaction to be carried out very safely. If appropriate, the alkoxylation can be carried out in the presence of an inert gas (e.g. nitrogen) or, to prepare polyether carbonates, in the presence of carbon dioxide even at a superatmospheric pressure of preferably from 1 to 20 bar absolute.

The lactones (VI) or cyclic anhydrides (VII) and (VIII) which can be used for preparing ester-modified polyethers can be added to the starter/catalyst mixture at the beginning of the start phase or be introduced in parallel to the epoxide at a later point in time. The introduction of the comonomers mentioned into the reactor can also alternate with the introduction of epoxides.

The molar ratio of the epoxide monomers to cyclic anhydrides can be varied. It is usual to use at least equimolar amounts of epoxide monomers based on anhydrides. Preference is given to using the epoxides in a molar excess in order to ensure complete conversion of anhydrides.

Lactones can be added during the alkoxylation either in a substoichiometric amount or a superstoichiometric amount based on the epoxide monomers.

To prepare carbonate-modified polyether-siloxanes bearing silyl groups, the alkoxylation takes place in the presence of either gaseous carbon dioxide or solid carbon dioxide introduced as dried ice. Preference is given to using carbon dioxide gas which can be introduced into the system composed of starter and DMC catalyst both before the start of the reaction, i.e. during the initialisation stage, and during the subsequent phase during which the epoxide monomers and any further comonomers are fed in. To increase the carbonate content of the end product, it is advantageous to feed in further carbon dioxide either continuously or in portions as a function of the carbon dioxide consumption, which can be seen from the pressure decrease in the autoclave, during the reaction. The reaction preferably occurs at pressures of less than 100 bar, particularly preferably less than 20 bar.

After the monomer addition and possible after-reaction to complete the monomer conversion, any residues of unreacted monomers still present and any further volatile constituents are removed, usually by vacuum distillation, gas stripping or other methods of deodorisation. The removal of volatile secondary components can be carried out either batchwise or continuously. In the process of the invention which is based on DMC catalysis, filtration can normally be omitted.

The process steps can be carried out at identical or different temperatures. The mixture of starter substance, DMC catalyst and, if appropriate, suspension medium which is placed in the reactor at the beginning of the reaction can, according to the teaching of WO 98/52689, be pretreated by stripping before introduction of monomer is commenced. Here, an inert gas is introduced into the reaction mixture via the feed line to the reactor and volatile components are removed from the reaction mixture by application of a reduced pressure with the aid of a vacuum unit connected to the reactor system. In this simple way, materials which can inhibit the catalyst, e.g. lower alcohols or water, can be removed from the reaction mixture. The addition of inert gas and the simultaneous removal of volatile components can be advantageous, particularly during start-up of the reaction since inhibiting compounds can also get into the reaction mixture via the addition of the reactants or as a result of secondary reactions.

As DMC catalyst, it is possible to use all known DMC catalysts, preferably those which contain zinc and cobalt, more preferably those comprising zinc hexacyanocobaltate (III). Preference is given to using the DMC catalysts described in U.S. Pat. No. 5,158,922, US 2003-0119663, WO 01/80994 or in the abovementioned documents. The catalysts can be amorphous or crystalline.

The catalyst concentration in the reaction mixture is preferably from >0 to 1000 wppm (ppm by mass), preferably from >0 to 300 wppm, particularly preferably from 0.1 to 200 wppm and very particularly preferably from 1 to 50 wppm. This concentration is based on the total mass of the alkoxysilyl-modified polyether-siloxanes formed.

The catalyst is preferably introduced only once into the reactor. The amount of catalyst is set so that a catalyst activity sufficient for the process is ensured. The catalyst can be introduced as solid or in the form of a catalyst suspension. If a suspension is used, starters of the Formula (IX) or (X) are particularly suitable as suspension medium. However, use of a suspension is preferably dispensed with.

In the introduction of the starting materials, good distribution of the materials participating in the chemical reaction, i.e. the epoxide monomers, starters, DMC catalyst and, if appropriate, suspension media or comonomers such as lactones, anhydrides or carbon dioxide, is necessary.

As reactors for the reaction claimed according to the invention, it is in principle possible to use all suitable types of reactor which allow the reaction and its possible evolution of heat to be controlled. The reaction can be carried out continuously, semicontinuously or batchwise in a manner known in process engineering and can be matched flexibly to the production facilities available. Apart from conventional stirred tank reactors, it is also possible to use jet loop reactors with a gas phase and internal heat-exchange tubes, as described in WO 01/062826. In addition, gas-phase-free loop reactors can be used.

2) Hydrosilylative Coupling of Unsaturated Polyethers Bearing Alkoxysilyl Groups to Hydrogensiloxanes According to the prior art, SiC-bonded polyether-siloxane copolymers are prepared by a hydrosilylation reaction with addition of siloxanes having SiH groups on to unsaturated polyethers, e.g. on to derivatives of vinyl alcohol or allyl alcohol. Among the large number of documents, mention may be made of EP 1 520 870, EP 0 075 703, U.S. Pat. No. 3,775,452 and EP 1 031 603.

As unsaturated polyethers, use has hitherto been made of alkoxylation products based on alkylene oxides such as ethylene oxide and propylene oxide, very rarely also based on other epoxide compounds or comonomers such as lactones.

It has surprisingly been found that even reactive unsaturated polyethers having alkoxysilyl groups which easily tend to undergo hydrolysis and crosslinking can be subjected to a hydrosilylation reaction without undesirable secondary reactions of the alkoxysilyl groups or the siloxane skeleton occurring. A process which allows alkoxysilyl-functional and thus curable polyether-siloxane structures to be obtained by the simple route of hydrosilylation has thus been made available for the first time.

Hydrogensiloxanes which can be used according to the invention are compounds of the Formula (XI) and mixtures thereof,

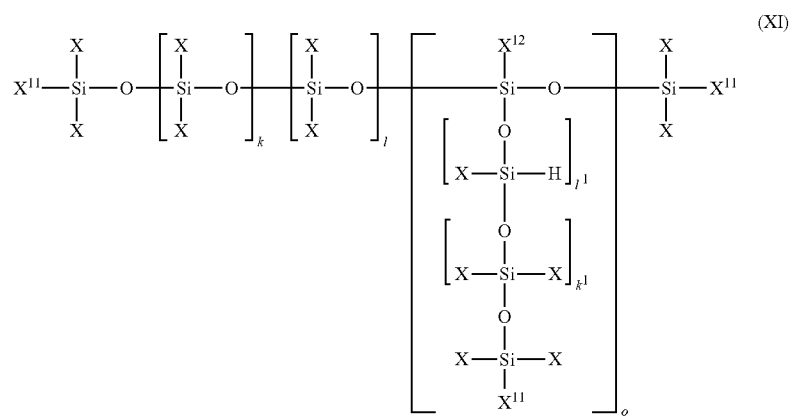

where
$X^{11}$ is, as desired, X or H,
$X^{12}$ corresponds, as desired, to $X^{11}$ or the fragment of the Formula (XIa),

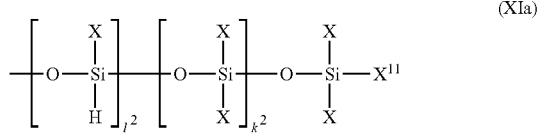

(XIa)

where the indices k, $k^1$, $k^2$, and o have the meanings given above for Formula (I) and
l, $l^1$, $l^2$ are each, independently of one another, an integer from 0 to 120, preferably from 0 to 60, in particular from 0 to 50, with the proviso that $X^{11}$ is hydrogen at least once when the sum of l, $l^1$ and $l^2$ is zero,
and with the proviso that the sum of l, $l^1$ and $l^2$ is at least 1 when $X^{11}$ is X.

Such hydrogensiloxanes can be prepared as described in the prior art in EP-A1-1 439 200 and the patent application DE 10 2007 055485.2, which is not a prior publication. The disclosure of EP-A1-1 439 200 is hereby fully incorporated by reference into the present description.

Suitable catalysts for the hydrosilylation reaction are, for example, transition metal catalysts of the d elements of transition groups 8 to 10 of the Periodic Table of the Elements, in particular platinum compounds such as hexachloroplatinic acid, cis-platinum, bis(cyclooctene)platinum dichloride, carbo-platinum, platinum(0)-divinyltetramethyldisiloxane complexes, known as Karstedt catalysts, or platinum(0) complexes complexed with various olefins. Further suitable catalysts are in principle rhodium, iridium and ruthenium compounds, for example tris(triphenylphosphine)rhodium(I) chloride or tris(triphenylphosphine)ruthenium(II) dichloride. Catalysts which are preferred for the purposes of the process of the invention are platinum(0) complexes, with particular preference being given to modified or unmodified Karstedt catalysts prepared as described, for example, in EP-A-1 520 870.

Reaction partners used for the hydrogensiloxanes can be all compounds which have been obtained by the alkoxylation process described in DE 10 2008 000360.3, which is not a prior publication, from starter compounds of the Formula (XII) and mixtures thereof

$R^1$—H (XII)

by alkoxylation using epoxy-functional alkoxysilanes of the Formula (III) and contain at least one unsaturated functional group capable of hydrosilylation and also at least one reactive hydroxyl group (the H belongs to the OH group of an alcohol or a phenolic compound). Compounds containing carbon-carbon double bonds and triple bonds, especially ones in which the unsaturated group is in a terminal position, are suitable for the hydrosilylation. The alkoxylation products bearing alkoxysilyl groups obtained as described in DE 10 2008 000360.3 can be converted either individually or in any mixture with one another into the SiC-bonded polyether-siloxanes according to the invention of the Formula (I) by hydrosilylation. It is also possible to add further hydrosilylatable, preferably likewise alkoxysilyl-functional compounds to the reaction mixture. These compounds include, for example, vinylic silane compounds such as vinyltrimethoxysilane, vinyltriethoxysilane, vinylmethyldimethoxysilane, vinylethyldiethoxysilane or other components bearing functional groups, e.g. allyl glycidyl ether.

$R^1$ corresponds to a monounsaturated or polyunsaturated, branched or unbranched aliphatic, cycloaliphatic or aromatic hydrocarbon radical or is an unsaturated polyether radical of the type of an alkoxy, arylalkoxy or alkylarylalkoxy group in which the carbon chain can be interrupted by oxygen atoms. The chain length of the polyether radicals having alkoxy, arylalkoxy or alkylarylalkoxy groups which can be used as starter compound can be chosen freely. The polyether, alkoxy, arylalkoxy or alkylarylalkoxy group preferably contains from 1 to 1500 carbon atoms, particularly preferably from 2 to 300 carbon atoms, in particular from 2 to 100 carbon atoms.

As OH functional starter compounds $R^1$—H (XII), preference is given to using compounds having molar masses of from 18 to 10 000 g/mol, in particular from 50 to 2000 g/mol, and having from 1 to 8, preferably from 1 to 4, hydroxyl groups.

As examples of compounds of the Formula (XII), mention may be made of allyl alcohol, 5-hexen-1-ol, 10-undecen-1-ol, monoallyl and diallyl ethers of trimethylolpropane, glycerol and pentaerythritol, 1,4-butynediol and, for example, propargyl alcohol and also alkoxylation products thereof.

Unsaturated low molecular weight polyetherols having 1-8 hydroxyl groups and molar masses of from 50 to 2000 g/mol which have been prepared beforehand by DMC-catalysed alkoxylation are advantageously used as starter compounds.

The hydrosilylation reaction can be carried out in a one-pot process or in a feed stream process, in one or more stages. To compatibilise the reactants or to simplify handling of highly viscose to solid reactants, the reaction can be carried out in solvents such as toluene or xylene. The reaction can likewise be carried out in the absence of solvents in the form of an emulsion polymerisation. The hydrosilylation can be operated industrially either in a stirred vessel as classical batch process or in a continuous process as described, for example, in EP 1 013 701.

The hydrosilylation catalysts can be introduced as solid or in dissolved form into the reaction mixture or into one of the reactants. The amounts of catalysts used are in the range from 1 to 500 ppm, preferably from 1 to 100 ppm and in particular from 1 to 30 ppm.

The hydrosilylation can be carried out at temperatures in the range from 20 to 200° C., preferably from 40 to 150° C. and particularly preferably from 60 to 120° C. The reaction conversion can be monitored by means of gas-volumetric determination of the siloxane-bonded hydrogen. Here, a sample of the reaction mixture is decomposed in alkaline solution and the hydrogen liberated is measured in a gas burette.

The products obtained by the hydrosilylation can be transparent or opalescent depending on the starting materials used. The viscosities are in the range from 1 to 100 000 mPas, preferably from 1 to 50 000 mPas and particularly preferably from 1 to 20 000 mPas.

The alkoxysilyl-functional polyether-siloxanes of the invention are suitable for producing curable compositions produced using alkoxysilyl-functional polyether-siloxanes.

The invention further provides compositions containing alkoxysilyl-functional polyether-siloxanes for use as surfactants, adhesives, sealants and binders, fillers, auxiliaries and additives, emulsifiers, wetting additives and dispersants, polymer additives, levelling agents for surface coatings, lubricants, as auxiliaries for tertiary petroleum recovery, as textiles assistants for softening fibres, yarns or sheet-like textile products, as antifoams, as cosmetic additives and as foam stabilisers, in particular in polyurethane foam.

The invention further provides compositions containing alkoxysilyl-functional polyether-siloxanes, if desired dissolved in a solvent, for use in a process suitable for coating, extrusion of plastics, adhesive bonding, stabilisation of polymers, wetting, defoaming, emulsification, dispersing and/or surface modification.

Further subjects of the invention are described by the claims, whose disclosure content is fully incorporated by reference into the description.

The polyether-siloxanes bearing silyl groups of the invention and the corresponding processes for preparing them are described by way of example below, without the invention being restricted to these illustrative embodiments.

If ranges, general formulae or classes of compounds are indicated in the following, these encompass not only the respective ranges or groups of compounds which are explicitly mentioned but also all subranges and subgroups of compounds which can be obtained by leaving out individual values (ranges) or compounds.

EXPERIMENTAL PART

In the examples presented below, the present invention is described by way of example without the invention, whose scope is defined by the total description and the claims, being restricted to the embodiments mentioned in the examples.

1) Alkoxylation of Silicone-Polyether Copolymers or Polysiloxanes Using Epoxy-Functional Alkoxysilanes Over Double Metal Cyanide Catalysts OH numbers were determined by the cold acetylation method using a procedure based on the analytical method C-V 17A (98) of the Deutsche Gesellschaft für Fettwissenschaft (DGF). The average molar masses were calculated from the OH numbers determined in this way. The epoxide oxygen content of the end products was determined in the presence of concentrated HCl according to the principle of backtitration with sodium hydroxide.

Example 1.1

As chain starter, use is made of a polyether-siloxane of the Formula (IX) having the structure k=27, $l^3$=5, $l^4$=o=0, X=$X^6$=methyl which has been prepared beforehand by hydrosilylation of a hydrogensiloxane using an excess of an OH-terminated allyl polyether having an average molar mass of 800 g/mol and comprising 64% by weight of ethylene oxide units and 36% by weight of propylene oxide units according to the prior art.

550 g of this polyether-siloxane and 0.071 g of zinc hexacyanocobaltate DMC catalyst are placed under nitrogen in a 3 litre autoclave and heated to 130° C. while stirring. The reactor is evacuated to an internal pressure of 30 mbar in order to remove any volatile constituents present by distillation. To activate the DMC catalyst, a portion of 40.0 g of propylene oxide is introduced. After 15 minutes and commencement of the reaction (pressure drop in the interior of the reactor), a further 166.8 g of 3-glycidyloxypropyltriethoxysilane (DYNASYLAN© GLYEO) are fed in continuously at 130° C. and a maximum internal pressure in the reactor of 0.2 bar absolute over a period of 1 hour. The 1 hour after-reaction at 130° C. is followed by the degassing stage. Here, volatile components are distilled off under reduced pressure. The finished medium-viscosity and colourless polyether-siloxane copolymer is cooled to below 80° C. and drained from the reactor.

The slightly yellowish product contains an average of 5 polyether chains which are each terminally triethoxysilyl-functionalised and bound via an SiC bond to the siloxane skeleton per polyether-siloxane molecule. The OH number is 39 mg KOH/g. Free epoxide groups cannot be detected in the end product.

Example 1.2

As chain starter, use is made of a linear polyether-siloxane of the Formula (IX) having the structure k=25, $l^3$=$l^4$=o=0, X=methyl, $X^6$=—(CH$_2$)$_6$—OH which has been prepared beforehand by hydrosilylation of a hydrogensiloxane by means of hexenol according to the prior art.

200 g of this polyether-siloxane and 0.027 g of zinc hexacyanocobaltate DMC catalyst are placed under nitrogen in a 1 litre glass flask with reflux condenser and heated to 130° C. while stirring. The reactor is evacuated to an internal pressure of 30 mbar in order to remove any volatile constituents present by distillation. To activate the DMC catalyst, a first portion of 10.0 g of 3-glycidyloxypropyltriethoxysilane (DYNASYLAN© GLYEO) is introduced. After 15 minutes, a further 88.4 g of DYNASYLAN© GLYEO are fed in continuously at 130° C. over a period of 1.5 hours. 28.8 g of 1,2-epoxybutane are subsequently added at 130° C. under gentle reflux over a period of 1.5 hours. After a 1 hour after-reaction, all the epoxybutane has reacted and reflux is no longer observed. Volatile components are distilled off at 130° C. under reduced pressure.

The finished low-viscosity and somewhat turbid polyether-siloxane copolymer contains an average of 2 terminal short polyether chains which are each triethoxysilyl-functionalised and capped by an epoxybutene block per polyether-siloxane molecule. The OH number is 49.6 mg KOH/g. Free epoxide groups cannot be detected in the end product.

Example 1.3

As chain starter, use is made of a polyether-siloxane of the Formula (IX) having the structure k=40, $l^3$=5.5, $l^4$=o=0, X=$X^6$=methyl which has been prepared beforehand by hydrosilylation of a hydrogensiloxane using an excess of an OH-terminated allyl polyether having an average molar mass of 1300 g/mol and comprising 18% by weight of ethylene oxide units and 82% by weight of propylene oxide units according to the prior art.

385.4 g of this polyether-siloxane and 0.045 g of zinc hexacyanocobaltate DMC catalyst are placed under nitrogen in a 3 litre autoclave and heated to 130° C. while stirring. The reactor is evacuated to an internal pressure of 30 mbar in order to remove any volatile constituents present by distillation. To activate the DMC catalyst, a portion of 36.0 g of propylene oxide is introduced. After 35 minutes and commencement of the reaction (pressure drop in the interior of the reactor), 65.9 g of 3-glycidyloxypropyltrimethoxysilane (DYNASYLAN© GLYMO) are fed in continuously at 130° C. and a maximum internal pressure in the reactor of 0.4 bar absolute over a period of 30 minutes. The 1 hour after-reaction at 130° C. is followed by the degassing stage. The finished medium-viscosity and virtually colourless polyether-siloxane copolymer is cooled to below 80° C. and drained from the reactor.

The product contains an average of 5.5 polyether chains which are each terminally trimethoxysilyl-functionalised per polyether-siloxane molecule. The OH number is 27 mg KOH/g. Free epoxide groups cannot be detected in the end product.

Example 1.4

As chain starter, use is made of a terminally SiOH-functional polysiloxane of the Formula (X) of the structure m=200, R'=methyl, $X^8$=H and a water content of <500 ppm.

360.0 g of this polysiloxane and 0.064 g of zinc hexacyanocobaltate DMC catalyst are placed under nitrogen in a 3 litre autoclave and heated to 130° C. while stirring. The reactor is evacuated to an internal pressure of 30 mbar in order to remove any volatile constituents present by distillation. To activate the DMC catalyst, a portion of 50.0 g of propylene oxide is introduced. After 40 minutes and commencement of the reaction (pressure drop in the interior of the reactor), firstly a further 182 g of propylene oxide, then 22.0 g of 3-glycidyloxypropyltriethoxysilane (DYNASYLAN© GLYEO) and finally another 116 g of propylene oxide are fed in continuously at 130° C. and a maximum internal pressure in the reactor of 0.3 bar absolute over a total time of 2.45 hours. The 1.5 hour after-reaction at 130° C. is followed by the degassing stage. The finished viscous and somewhat turbid polyether-siloxane copolymer is cooled to below 80° C. and drained from the reactor.

The product contains an average of 2 polyether chains which have a block structure and are each triethoxysilyl-functionalised and bound via an SiOC bond to the siloxane skeleton per polyether-siloxane molecule. The OH number is 2.6 mg KOH/g. Free epoxide groups cannot be detected in the end product.

2) Hydrosilylative Coupling of Unsaturated Polyethers which Bear Alkoxysilyl Groups and have been Obtained Beforehand by Alkoxylation of the Corresponding Unsaturated Starter Compounds by Means of Epoxy-Functional Alkoxysilanes Over DMC Catalysts.

Example 2.1

25 g of heptamethyltrisiloxane and 225 g of an allylpolyoxyalkylene prepared by the process described in the hitherto unpublished patent application DE 10 2008 000360.3 and having an average molar mass of 1350 g/mol, an ethylene oxide content of 28% by weight, a propylene oxide content of 30% by weight and a Dynasylan© GLYEO content of 42% by weight and an average of 2 triethoxysilyl groups are heated to 70° C. in a four-necked flask equipped with a precision glass stirrer, an internal thermometer and a reflux condenser while stirring. 5 ppm of platinum in the form of a platinum(0) catalyst which has been modified as described in EP 1520870 are added by means of a syringe. The conversion determined by gas volumetry is quantitative after 2.5 hours. The only slightly turbid, yellowish product has a viscosity of 717 mPas.

Example 2.2

25 g of heptamethyltrisiloxane and 252 g of an allylpolyoxyalkylene prepared by the process described in the hitherto unpublished patent application DE 10 2008 000360.3 and having an average molar mass of 1510 g/mol, an ethylene oxide content of 10% by weight, a propylene oxide content of 52% by weight and a Dynasylan© GLYEO content of 38% by weight and an average of 2 triethoxysilyl groups are heated to 70° C. in a four-necked flask equipped with a precision glass stirrer, an internal thermometer and a reflux condenser while stirring. 5 ppm of platinum in the form of a platinum(0) catalyst which has been modified as described in EP 1520870 are added by means of a syringe. The conversion determined by gas volumetry is quantitative after 2.5 hours. The only slightly turbid, yellowish product has a viscosity of 494 mPas.

The invention claimed is:

1. An alkoxysilyl-functional polyether-siloxane or a mixture of such polyether-siloxanes having the Formula (I) or a mixture of such polyether-siloxanes, the Formula (I) being:

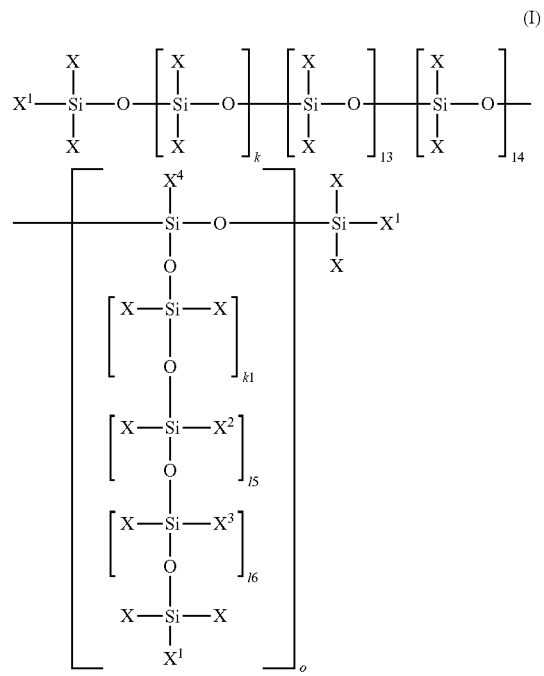

where X is a linear, cyclic or branched, aliphatic or aromatic, saturated or unsaturated hydrocarbon radical which has from 1 to 20 carbon atoms and may, if desired, contain heteroatoms;

where $X^1$ is, as desired, X, $X^2$ or $X^3$;

where $X^2$ is an OH-functional, if desired, ester- or carbonate-modified polyoxyalkylene radical bearing alkoxysilyl groups and having the Formula (Ia);

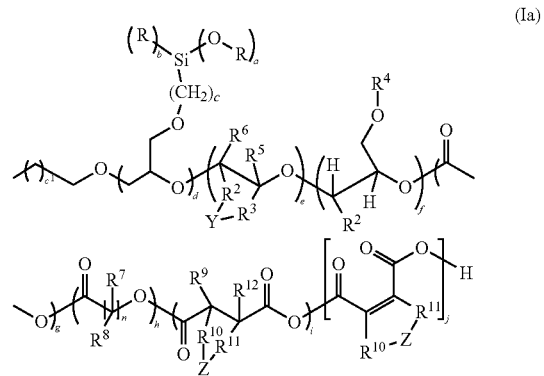

where $X^3$ is a terminally etherified polyoxyalkylene radical of the Formula (Ib);

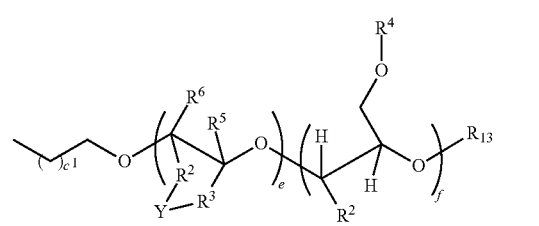

where $R^{13}$ is, as desired, an alkyl group having from 1 to 18 carbon atoms, or a polyoxyalkylene radical terminally esterified with a monofunctional carboxylic acid and having the Formula (Ic);

$$\text{(Ic)}$$

$$\underset{\underset{Y-R^3}{|}}{R}_{c^1}-O-\left(\begin{array}{c}R^6\\|\\\underset{R^5}{|}\\\underset{|}{|}\\R^2\end{array}\right)_e-O-\underset{\underset{H}{|}}{\underset{|}{C}}\underset{\underset{R^2}{|}}{\underset{|}{H}}-O-\underset{\underset{O}{\|}}{C}-R^{14}$$

where $R^{14}$ is a saturated or monounsaturated or polyunsaturated, either linear or branched, aliphatic or aromatic hydrocarbon radical which has from 1 to 30 carbon atoms and may in turn bear OH groups;

where $X^4$ corresponds either to $X^1$ or the fragment of the Formula (Id);

$$\text{(Id)}$$

$$-O-\left[\begin{array}{c}X\\|\\Si-O\\|\\H\end{array}\right]_{k^2}\left[\begin{array}{c}X^2\\|\\Si-O\\|\\X\end{array}\right]_{l^7}\left[\begin{array}{c}X\\|\\Si-O\\|\\X\end{array}\right]_{l^8}\begin{array}{c}X\\|\\Si-X^1\\|\\X\end{array}$$

where k, $k^1$, and $k^2$ are each, independently of one another, integers from 0 to 500;

where $l^3$, $l^4$, $l^5$, $l^6$, $l^7$ and $l^8$ are each, independently of one another, an integer from 0 to 60; and where o is an integer from 0 to 10;

with the proviso that;

$X^1$ is at least once identical to $X^2$ if the sum of $l^3$, $l^5$ and $l^7$ is zero; and the sum of $l^3$, $l^5$ and $l^7$ is at least 1 when $X^1$ is not identical to $X^2$;

where a is an integer from 1 to 3;

where b is an integer from 0 to 2;

where the sum of a and b is 3;

where c is an integer from 0 to 24;

where $c^1$ is an integer from 0 to 24;

where d is an integer from 1 to 500;

where e is an integer from 0 to 5000;

where n is an integer from 2 to 8; and where f, g, h, i, and j are each an integer from 0 to 500;

with the proviso that the fragments having the indices d to j can be freely permutated among one another, i.e. can be exchanged with one another in the sequence within the polyether chain, and the various monomer units of the fragments having the indices d to j can be arranged in blocks or else can be distributed randomly; and with the proviso that the fragments having the indices k, $k^1$, $k^2$, $l^3$, $l^4$, $l^5$, $l^6$, $l^7$, $l^8$ and o can be permutated freely among one another, i.e. can be exchanged with one another within the siloxane chain and can, as desired, be randomly distributed or arranged in blocks;

where R represents one or more identical or different radicals selected from among linear or branched, saturated, monounsaturated or polyunsaturated alkyl radicals having from 1 to 20 carbon atoms or haloalkyl groups having from 1 to 20 carbon atoms; and where $R^2$ or $R^3$, and also $R^5$ or $R^6$ are identical or are each, independently of one another, H or a saturated or, if desired, monounsaturated or polyunsaturated, also further substituted, if desired, monovalent or polyvalent hydrocarbon radical, where the radicals $R^5$ and $R^6$ are each a monovalent hydrocarbon radical and the hydrocarbon radical can be cycloaliphatically bridged via the fragment Y, where Y can also be absent or else is a methylene bridge having 1 or 2 methylene units; if Y is absent, $R^2$ or $R^3$ are each, independently of one another, a linear or branched radical which has from 1 to 20 carbon atoms and may be further substituted and bear functional groups;

where $R^4$ is a linear or branched alkyl radical which has from 1 to 18 carbon atoms and can be bound to an aromatic or cycloaliphatic radical; and where $R^7$ and $R^8$ are, independently of one another, either hydrogen, alkyl, alkoxy, aryl or aralkyl groups;

where $R^9$, $R^{10}$, $R^{11}$, and $R^{12}$ are, independently of one another, either hydrogen, alkyl, alkenyl, alkoxy, aryl, or aralkyl groups, where the hydrocarbon radical can be cycloaliphatically or aromatically bridged via the fragment Z and Z can be either a divalent alkylene radical or an alkenylene radical.

2. A comb-like branched copolymer in the form of a polyether-siloxane according to claim 1 having the alkoxysilyl functionalisation of the Formula (I) in which:
the polyether chains are each bound via SiC bonds to the polysiloxane backbone.

3. A linear polyether-siloxane-polyether triblock copolymer having:
Si—C bonding according to claim 1 in which:
o is 0 (zero);
$l^3 = l^4 = 0$ (zero); and
$X^1 = X^2 =$ an alkoxysilylpolyether radical.

4. A branched polyether-siloxane-polyether block copolymer having;
Si—C bonding according to claim 1 in which:
o is not equal to 0 (zero);
$l^3 = l^4 = 0$ (zero);
$l^5 = l^6 = 0$ (zero); and
$X^1 = X^2 =$ an alkoxysilylpolyether radical.

5. A process for preparing alkoxysilyl-functional polyether-siloxanes and mixtures thereof according to claim 1, the method comprising:
alkoxylating polyether-siloxanes by means of epoxides bearing alkoxysilyl groups with the aid of DMC catalysts.

6. The process for preparing alkoxysilyl-functional polyether-siloxanes according to claim 5;
wherein alkoxysilyl-functional polyether-siloxanes of the Formula (I) and mixtures thereof are obtained by:
a) alkoxylation of silicone-polyether copolymers by means of epoxy-functional alkoxysilanes over double metal cyanide catalysts; and
b) hydrosilylative coupling of unsaturated polyethers bearing alkoxysilyl groups which have been obtained beforehand by alkoxylation of the corresponding unsaturated starter compounds by means of epoxy-functional alkoxysilanes over DMC catalysts.

7. The process according to claim 6 for preparing alkoxysilyl-functional polyether-siloxanes of the Formula (I) and mixtures thereof;
wherein unsaturated polyethers bearing alkoxysilyl groups are hydrosilylatively coupled with hydrogensiloxanes.

8. The process according to claim 7;
wherein hydrogensiloxanes of the Formula (XI) and mixtures thereof are utilized, the Formula (XI) being:

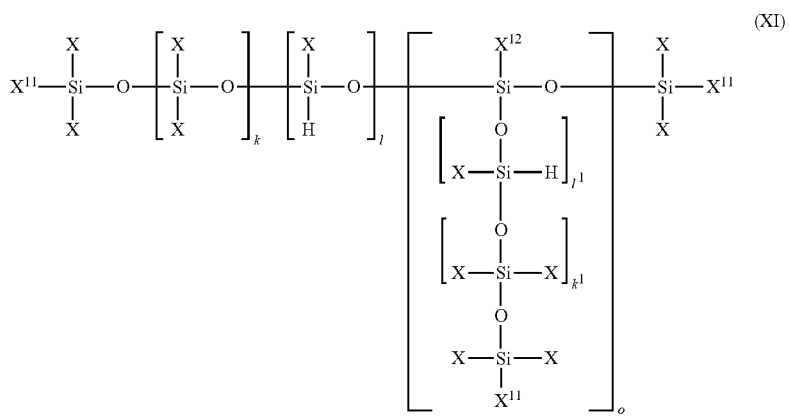

where $X^{11}$ is, as desired, X or H;
where $X^{12}$ corresponds, as desired, to $X^{11}$ or the fragment of the Formula (XIa);

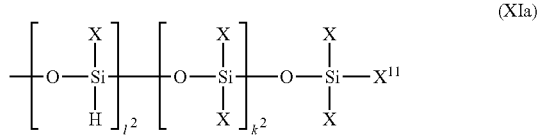

where the indices k, $k^1$, $k^2$, and to have the meanings given above for Formula (I); and
where l, $l^1$, $l^2$ are each, independently of one another, an integer from 0 to 120;
with the proviso that $X^{11}$ is hydrogen at least once when the sum of l, $l^1$ and $l^2$ is zero, and with the proviso that the sum of l, $l^1$ and $l^2$ is at least 1 when $X^{11}$ is X.

9. The process according to claim 5 for preparing alkoxysilyl-functional polyether-siloxanes of the Formula (I) and mixtures thereof;
wherein at least one epoxy-functional alkoxysilane of the Formula (III) is added on to free polyethers of the polyether-siloxane systems functioning as starter compounds with ring opening, the Formula (III) being:

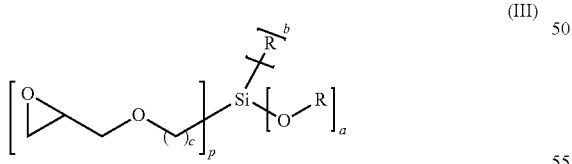

where the indices a, b and c and also the radical R have the meanings defined for Formula (Ia) and p is an integer corresponding to the difference 4-a-b.

10. The process according to claim 9;
wherein 3-glycidyloxypropyltritmethoxysilane, 3-glycidyloxypropyltriethoxysilane, 3-glycidyloxypropyltripropoxysilane, 3-glycidyloxypropyltriisopropoxysilane, 3-glycidyloxyhexyltrimethoxysilane, 3-glycidyloxyhexyltriethoxysilane, 3-glycidyloxypropylmethyldimethoxysilane, 3-glycidyloxypropylethyldiethoxysilane are used as epoxide-functional alkox-ysilanes of the Formula (III).

11. A process for preparing alkoxysilyl-functional polyether-siloxanes and mixtures thereof according to claim 1, the process comprising:
a transition-metal catalysed SiC coupling of hydrogensiloxanes having SiH groups with unsaturated polyethers bearing alkoxysilyl groups.

12. The process for preparing alkoxysilyl-functional polyether-siloxanes according to claim 11;
wherein the process proceeds with retention of the siloxane skeleton.

13. A polymer article produced using alkoxysilyl-functional polyether-siloxanes according to claim 1.

14. A curable composition produced using alkoxysilyl-functional polyether-siloxanes according to claim 1.

15. A composition containing:
alkoxysilyl-functional polyether-siloxanes according to claim 1 for use as surfactants, adhesives, sealants and binders, fillers, auxiliaries and additives, emulsifiers, wetting additives and dispersants, polymer additives, levelling agents for surface coatings, lubricants, as auxiliaries for tertiary petroleum recovery, as textiles assistants for softening fibres, yarns or sheet-like textile products, as antifoams, as cosmetic additives, and as foam stabilisers.

16. A composition containing:
alkoxysilyl-functional polyether-siloxanes according to claim 1, if desired dissolved in a solvent, for use in a process suitable for coating, extrusion of plastics, adhesive bonding, stabilisation of polymers, wetting, defoaming, emulsification, dispersing and/or surface modification.

17. The alkoxysilyl-functional polyether-siloxane according to claim 1 having Formula (I):
wherein $R^2$ or $R^3$ are each, independently of one another, a linear or branched radical, which has from 1 to 20 carbon atoms and may be further substituted with halogens, hydroxyl groups or glycidyloxypropyl groups.

18. A linear polyether-siloxane-polyether triblock copolymer of the Formula (II) in which the polyether chains having alkoxysilyl groups are bound via an Si—O—C linkage to the siloxane body, the Formula (II) being:

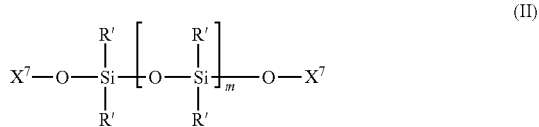

(II)

where R' corresponds to one or more identical or different, linear or branched, saturated, monounsaturated or polyunsaturated alkyl radicals having from 1 to 20 carbon atoms;

where m is an integer from 0 to 5000; and where $X^7$ corresponds to the polyether fragment of the Formula (IIa):

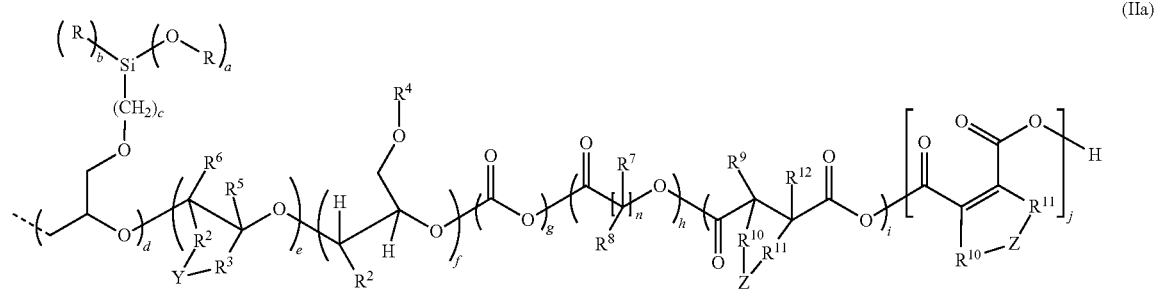

(IIa)

where a is an integer from 1 to 3;
where b is an integer from 0 to 2;
where the sum of a and b is 3;
where c is an integer from 0 to 24;
where d is an integer from 1 to 500;
where e is an integer from 0 to 5000;
where n is an integer from 2 to 8; and
where f, g, h, i, and j are each an integer from 0 to 500;
with the proviso that the fragments having the indices d to j can be freely permutated among one another, i.e. can be exchanged with one another in the sequence within the polyether chain, and the various monomer units of the fragments having the indices d to j can be arranged in blocks or else can be distributed randomly;

where R represents one or more identical or different radicals selected from among linear or branched, saturated, monounsaturated or polyunsaturated alkyl radicals having from 1 to 20 carbon atoms or haloalkyl groups having from 1 to 20 carbon atoms; and where $R^2$ or $R^3$, and also $R^5$ or $R^6$ are identical or are each, independently of one another, H or a saturated or, if desired, monounsaturated or polyunsaturated, also further substituted, if desired, monovalent or polyvalent hydrocarbon radical, where the radicals $R^5$ and $R^6$ are each a monovalent hydrocarbon radical and the hydrocarbon radical can be cycloaliphatically bridged via the fragment Y, where Y can also be absent or else is a methylene bridge having 1 or 2 methylene units; if Y is absent, $R^2$ or $R^3$ are each, independently of one another, a linear or branched radical which has from 1 to 20 carbon atoms and may be further substituted and bear functional groups;

where $R^4$ is a linear or branched alkyl radical which has from 1 to 18 carbon atoms and can be bound to an aromatic or cycloaliphatic radical; and where $R^7$ and $R^8$ are, independently of one another, either hydrogen, alkyl, alkoxy, aryl or aralkyl groups;

where $R^9$, $R^{10}$, $R^{11}$, and $R^{12}$ are, independently of one another, either hydrogen, alkyl, alkenyl, alkoxy, aryl, or aralkyl groups, where the hydrocarbon radical can be cycloaliphatically or aromatically bridged via the fragment Z and Z can be either a divalent alkylene radical or an alkenylene radical.

19. A process for preparing a linear polyether-siloxane-polyether triblock copolymer of Formula (II) according to claim 18 and mixtures thereof, the method comprising:

reacting linear polydimethylsiloxanediols or SiOC-bonded polyether-siloxanes of the Formula (X) with epoxy-functional alkoxysilanes and, if desired, further monomers in the presence of a DMC catalyst to form linear polyether-siloxane-polyether triblock copolymer of Formula (II), the Formula (X) being:

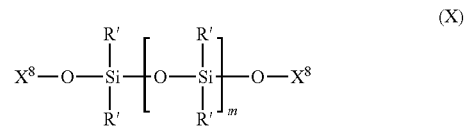

(X)

where R' and m correspond to the meanings in Formula (II) set forth in claim 18; and where $X^8$ is either hydrogen or corresponds to the of polyether fragment of the Formula (Xa):

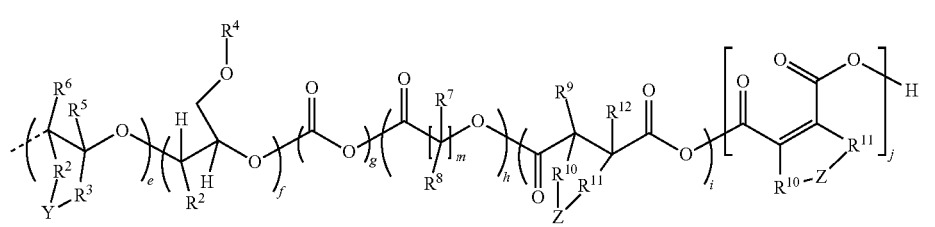

(Xa)

where the indices e, f, g, h, i, j and n and also the radicals $R^2$ to $R^{12}$ and also Y and Z have the meanings given above for the Formula (II) set forth in claim 18, with the provisos that:

the fragments denoted by the indices e, f, g, h, i, and j in the polyether chain can be freely permutated among one another, i.e. can be exchanged with one another in the sequence within the chain and can be arranged in blocks or be randomly distributed;

the polyether-siloxanes described by the Formula (X) include the by-products which may be present as a result of the process; and the numerical values of e, f, g, h, I, and j are less than or equal to the values of these indices in Formula (H) set forth in claim 18.

20. The process of claim 19;

wherein at least one epoxy-functional alkoxysilane of the Formula (III), is added on to OH-bearing siloxane-bound or free polyethers of the polyether-siloxane systems functioning as starter compounds with ring opening.

* * * * *